Figure 1:
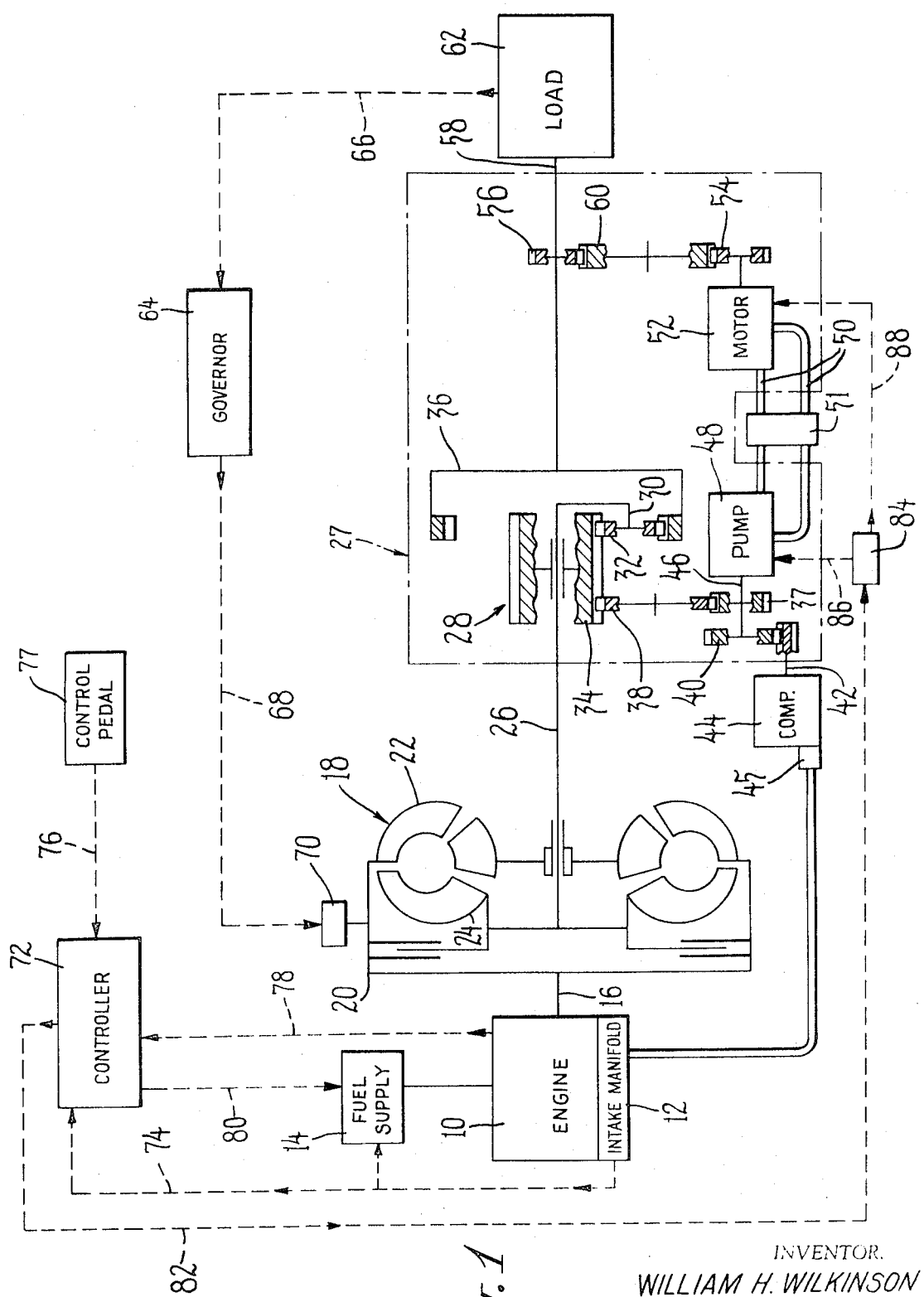

United States Patent

Wilkinson

[15] 3,665,787
[45] May 30, 1972

[54] POWER PLANT

[72] Inventor: William H. Wilkinson, Columbus, Ohio

[73] Assignee: Perkins Services N.V., Curacao, Netherlands Antilles

[22] Filed: July 24, 1970

[21] Appl. No.: 58,011

[52] U.S. Cl..................................74/674, 74/675, 74/857, 74/705
[51] Int. Cl....................................F16h 37/06, B60k 21/00
[58] Field of Search....................74/674, 687, 733, 856–860, 74/705

[56] References Cited

UNITED STATES PATENTS

| | | | |
|---|---|---|---|
| 3,442,153 | 5/1969 | Koss | 74/687 |
| 3,391,584 | 7/1968 | Glamann | 74/674 |
| 3,013,442 | 12/1961 | Fox et al. | 74/857 |

Primary Examiner—Arthur T. McKeon
Attorney—Gerhardt, Greenlee & Farris

[57] ABSTRACT

A power plant includes an internal combustion engine which drives a planetary differential through a lockable hydrostatic torque converter. One of the differential outputs drives a supercharging air compressor, while the other output drives the power plant load through a drive shaft. The two outputs are inter-connected by a variable displacement hydrostatic drive including a pump and a motor. Thus a split path drive through the hydrostatic leg and through the mechanical connection to the output is provided. A controller receives an engine speed signal, a manifold pressure signal and an engine speed setting and provides an output signal to control a variable fuel supply to the engine and another output signal for controlling adjustment of the hydrostatic pump and motor. A governor is responsive to the speed of the load to control lock-up of the torque converter. In operation at high load speeds, the hydrostatic drive leg is locked out, the compressor is idle, and the torque converter is locked up, yielding an overdrive ratio. Higher power demands caused by increases in power plant load will cause activation of the hydrostatic leg to vary the drive ratio and activate the compressor to increase engine power. Upon further increase of the load, the torque converter unlocks, enabling torque multiplication and maintenance of relatively high engine speed for high power output. The effect of this power plant is to provide reserve power in a usable range only, while maintaining engine speed in an optimum power range.

27 Claims, 2 Drawing Figures

INVENTOR.
WILLIAM H. WILKINSON
BY
Gerhardt, Greenlee & Farris
ATTORNEYS.

POWER PLANT

This invention relates to power plants and more particularly to a power plant having a selectively controllable split power device to produce a desired power output characteristic.

In commercial vehicles such as trucks, the usual method of obtaining a high power output over a wide range of load speeds is to provide a large, naturally aspirated engine or a smaller supercharged engine and to provide a multi-speed manually shiftable transmission or an automatic transmission to enable the engine to operate in a relatively high speed and high power output range. However, even with multi-speed or automatic transmissions, the optimum engine speed for maximum power output occurs only at as many load speeds as there are transmission speed ratios, since peak power occurs over a relatively narrow range of engine speeds.

With modern traffic conditions, it is necessary that commercial trucks have a grade climbing capability to maintain minimum speeds on grade on interstate highways and also to enable faster journey times. It is also necessary, with heavy traffic conditions, that a truck be able to enter an interstate highway and accelerate to traffic flow speed in the minimum time possible.

In order to provide sufficient reserve power to enable a truck to maintain reasonable speeds on grades and to provide an acceleration capability, it has been necessary to use larger displacement engines which then cannot operate at full efficiency at part load on level grade. By turbo supercharging a smaller engine, the maximum power output can be raised within certain limits. However, the reserve power available for grade operations of the vehicle is still limited, since the supercharger is driven by exhaust gases.

It has been proposed to provide a constant power power plant having a differentially driven mechanical supercharger with a split of power between the power plant load and the supercharger. This type of device, sometimes known as a differentially driven engine, has some advantages over a turbocharged engine in that a high power output can be maintained over a relatively wide output speed range, because a reduction in load or drive shaft speeds will produce an increased speed of the supercharger. However, this range is sill limited and some speed change transmission must still be provided to further increase the speed range to practical values. Also, the reserve power available for grade operation is limited to the peak engine power which is at a relatively high engine speed.

It is therefore desirable to have a power plant which provides a reserve power capability under the two main conditions when a heavy duty commercial vehicle such as a truck requires it, i.e. when encountering grades and when accelerating to road speeds.

It is an object of this invention to provide a power plant having a reserve power capability which is automatically called upon when needed and which maintains engine speeds within a desirable power output range.

It is another object of this invention to provide a power plant which maintains a relatively constant engine speed over a wide range of load speeds and also causes the engine power output to increase upon increases in the power plant load.

It is a further object of this invention to provide a power plant which can be controlled to operate at low engine speeds up to large fuel/air ratios over a wide range of output speeds and also causes the engine power to increase upon increases in the power plant load by increasing engine speed at large fuel/air ratios.

In carrying out the aforementioned objects, a power plant is provided which consists of an air breathing engine having a fuel supply, a variable power splitting device having an input and first and second outputs, first connecting means operatively interconnecting the engine and the input, second connecting means operatively interconnecting the first output and the load, an auxiliary air device for the engine connected to the second output, and regulating means for the power plant including a controller for automatically controlling the speed ratio of the variable power splitting device to vary the power split between the outputs to cause the power plant to produce a predetermined power output characteristic.

Further, a power plant is provided which consists of an air breathing engine having an intake manifold, characterized by a variable fuel supply, a differential device having an input and first and second outputs, first connecting means operatively interconnecting the engine and the input, second connecting means operatively interconnecting the first output and the load, an auxiliary air device for the engine connected to the second output, variable ratio power transmitting means connecting one output with the other output or input, and regulating means for the power plant including a controller for controlling the ratio of the variable ratio power transmitting means to control the speed relationship among the engine, load and auxiliary air device and thereby cause the power plant to produce a predetermined power output characteristic.

This invention provides what may be termed a controllable split path power plant.

Figure 2:
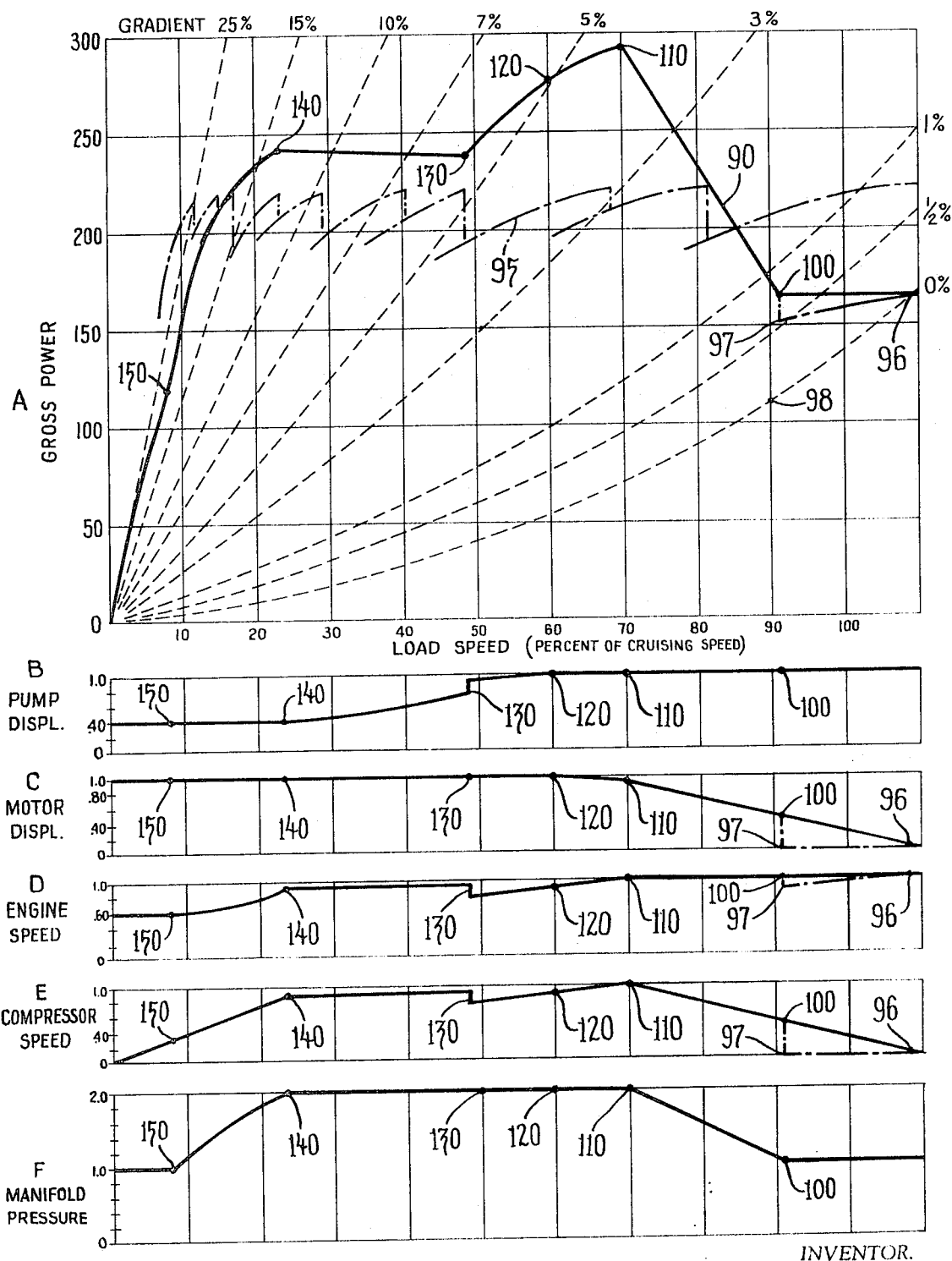

This invention can be better understood by reference to the following detailed description of a preferred embodiment shown in the attached drawings wherein:

FIG. 1 is a schematic representation of a power plant according to this invention including a control system therefor; and FIG. 2 is a graphic representation of the characteristics for a specific form of the subject power plant, showing gross horsepower output, pump displacement, motor displacement, engine speed, compressor speed, and pressure ratio plotted against load speed.

Referring now to FIG. 1 of the drawings, an air breathing internal combustion engine 10, preferably a diesel engine, has an intake manifold 12 and is supplied with fuel from a variable fuel supply device 14. These may be mounted in a stationary power plant or in a commercial truck or other vehicle, not shown. The output shaft 16 of the engine 10 drives a variable speed torque transmitting device, preferably a hydrodynamic torque converter 18. A lock-up clutch 20 interconnects the shaft 16 and an impeller 22 with a turbine 24 secured on a shaft 26.

Shaft 26 is the input for a variable power splitting device, generally denoted 27, which includes a differential device in the form of a planetary gearset 28. Thus, the torque converter forms connecting means between the engine and the differential. The shaft 26 is connected to a planet carrier 30 which journals a plurality of planet pinions 32 that mesh with a sun gear 34 and a ring or internal gear 36. The sun gear 34, which forms one output of the differential, drives a gear 37 through an idler gear 38. Gear 37 is rigidly connected to another gear 40 which drives a shaft 42, forming a first output of the variable power splitting device 27. Shaft 42 drives a supercharging positive displacement air compressor 44 which is connected through a bypass 45 to the manifold 12.

Gear 37 is also rigidly mounted on the input shaft 46 of a conventional variable displacement hydrostatic pump device 48. The pump 48 is conventionally connected by hydraulic lines 50 through a reversing valve 51 to a variable displacement hydrostatic motor device 52. The output shaft 54 of motor 52 drives a gear 56 rigidly mounted on a shaft 58 through an idler gear 60. The shaft 58 is further rigidly connected to the ring gear 36 for drive thereby and forms another output for the differential. Thus the hydrostatic pump and motor comprise variable power transmitting means interconnecting two of the differential members. The shaft 58 forms a second output for the variable power splitting device 27 and is connected at its terminal end with a load 60, which could be the drive wheels, not shown, of a truck.

It is thus seen that the engine 10, through the torque converter 18, drives a variable power splitting device including differential gearing 28 which splits the power between a mechanical connection, via ring gear 36 directly to the output shaft 58, and a variable hydrostatic leg, comprising pump 48 and motor 52. It is also readily seen that the compressor 44 is rigidly connected for rotation in response to operation of the hydrostatic pump.

The regulating or control means for the power plant will now be discussed with reference again to FIG. 1. A governor 64 is adapted to receive a load speed signal 66 and send out a control signal 68 to a control valve or the like 70 for the torque converter lock-up clutch 20. A controller 72 receives a manifold pressure signal 74 from manifold 12, a speed setting or an input signal 76 from a manually operated operator's control pedal 77, and also an engine speed signal 78. Controller 72 sends an output control signal 80 to the fuel supply 14, which also receives the manifold pressure signal 74 from the manifold 12. Controller 72 also sends an output signal 82 directly to a control device 84 which regulates the displacements of the hydrostatic pump 48 and motor 52 via respective signals 86 and 88.

It is thus seen that the speed of the load controls lock-up of the torque converter. The control pedal setting, engine speed and manifold pressure combine to produce a signal to control displacement of the hydrostatic pump and motor and operation of the compressor 44, and also control the engine fuel supply, as modified by sensed manifold pressure, to provide the desired fuel/air ratio.

As previously noted, it is desirable to provide a power plant having a reserve power capability which may be used in the two conditions most critical for a truck, i.e. upon encountering grades at road speed and during acceleration to road speed upon entering a highway. By referring now to FIG. 2, which illustrates the power and component operating characteristics of a specific form of this invention installed in a truck, it will be seen that the subject power plant accomplishes these objectives.

In the upper portion of FIG. 2 the abscissa of the graph is calibrated in per cent of cruising road (load) speed for a typical 45,000 lb. G.V.W. truck, while the ordinate measures power plant gross output horsepower. The solid line curve denoted 90 shows the maximum power output characteristics of the truck provided with the subject power plant and will be later described. The chain line curve denoted 95 shows the maximum power output characteristics of the same truck provided with a power plant comprising a larger naturally aspirated engine, having 40 per cent more horsepower than the subject engine 10, and a 10-speed manual transmission. The dashed gradient lines marked in per cent of gradient establish the grade climbing capability of both power plants.

It will be noted that in the lower and higher speed ranges, curve 95 evidences a greater power output than does curve 90, while in the mid-range speeds curve 90 illustrates a superior power output capability. It will be seen that a truck having the subject power plant has a greater speed capability on grades between 2 per cent and approximately 18 per cent than the truck having the larger engine power plant for this representative example.

The remainder of FIG. 2 graphically describes the operational characteristics of each major component of the subject power plant. The graphs B, C, D, E and F respectively plot pump displacement, motor displacement, engine speed, compressor speed (in all of which 1.0 = respective maximum displacements, maximum power speed and maximum desired speed) and manifold pressure (in atmospheres) vs load speed. These graphs will now be explained in conjunction with an operational description of grade climbing ability of the aforementioned truck powered by the subject power plant.

Referring now to graph A, assume that the truck is traveling along a level or 0 per cent gradient road where the required power, represented by curve segment 96–100, is less than the maximum power capability of the engine in overdrive. At these load speeds, represented by the 0 per cent dashed gradient curve segment 96–98, governor 64 causes the torque converter clutch 20 to be locked up. The less than maximum engine speed requested of controller 72 by the operator's pedal signal 76 causes motor 52 to be at 0 per cent displacement and pump 48 to be at 100 per cent displacement, as noted in graphs B and C. Even when the operator input signal 76 is for a lower engine speed, the above condition is produced regardless of signal 82, because the hydrostatic adjustment is at its highest limit and cannot further adjust. However, in this instance the fuel signal 80 causes the fuel supply 14 to reduce the fuel to the engine. Whereas operation on a level road at point 96 would be at maximum fuel/air ratio, operation at point 98 would be at a reduced fuel/air ratio because less power is needed. With the motor 52 at 0 per cent displacement, pump 48 provides a stationary reaction for the planetary differential 28 to produce a purely mechanical overdrive through ring gear 36. Since pump 48 is stationary, compressor 44 is not being driven, as noted in graph E. During this time the engine is operating at a fixed relation to load speed and, as noted in graph F, at atmospheric pressure which is provided by the compressor bypass valve 45.

As a grade is encountered, the load speed decreases as the load increases until controller 72 causes a maximum fuel/air ratio to be delivered by the fuel supply 14. As the operator senses the reduction in load speed he would operate pedal 77 to increase the engine speed setting 76. Assuming the pedal 77 is completely depressed, the desired engine speed setting would be 1.0 and power plant power output characteristics would move from curve segment 96–98 to the corresponding portion of curve 90.

To maintain maximum engine speed, controller 72 effects and increases displacement of motor 52, graph C, which changes the drive ratio to load 62 since the hydrostatic leg of the split path power transmission is actuated as pump 48 can now rotate. This also causes compressor 44 to rotate and begin to supply some of the air to manifold 12, graph E.

When load speed reaches point 100, motor displacement has increased to 0.40, enabling compressor speed to reach 0.50 to supply all the air to manifold 12 at atmospheric pressure. Thus point 100 may be termed an atmospheric point. Engine speed has been kept at 1.0 (maximum power speed) by the changing drive ratio enabled by increased power flow through the ratio-changing hydrostatic leg.

In a practical system, system pressures, heat and friction would preclude efficient operation of the hydrostatic leg at small motor displacements. Thus motor displacement would be held at 0 and then suddenly increased from 0 to 0.40, as indicated by chain lines 96–97–100, graph C. This would cause equivalent compressor operation similarly shown in graph E so that all engine air would be supplied by bypass 45 until then. This practical operation would cause engine speed, graph D, to decrease along chain lines 96–97 in proportion to load speed decrease because of the all-mechanical overdrive. Engine speed would then suddenly increase, 97–100. Chain line curve 96–97–100 on graph A shows that output power would decrease as engine speed slows from its maximum power speed, then suddenly increase. The fuel supply to the slowing engine would be correspondingly decreased, as controller 72 senses the speed decrease, to maintain the proper fuel/air ratio.

If the grade is sufficiently steep so that output speed decreases further, curve 90 reaches another point 110 which may be termed the peak power point. Between points 100 and 110, controller 72 gradually increases motor displacement to approximately 0.90 which enables the compressor to speed up to approximately 1.0, yielding a manifold pressure of 2 atmospheres. During this time the fuel supply is increased in response to the sensed increase in manifold pressure, engine speed is maintained at 1.0 by the changing transmission ratio caused by increased power flow through the ratio-changing hydrostatic transmission leg.

As output speed further slows, the power output of the power plant degrades slightly. At load speeds below point 110, a continuation of the previous rate of motor displacement change would increase compressor speed at a constant engine speed and result in a manifold pressure in excess of 2 atmospheres, a maximum value arbitrarily set because of engine capabilities of an exemplary engine. To prevent this, controller 72 slows the rate of motor displacement change, 110–120 in graph C, which causes the engine to slow as load speed decreases. Because the compressor speed decreases at a slower rate than engine speed, and due to speed-sensitive engine breathing characteristics under supercharge, a 2 atmosphere manifold pressure will be maintained. Controller 72 adjusts the fuel supply 14 to maintain optimum fuel/air ratio. Thus, since engine speed decreases from the maximum power speed at constant supercharge, output power will decrease, 110–120 in graph A. At point 120, termed the crossover point, motor displacement reaches and is maintained at 1.0 while controller 72 decreases the pump displacement to provide further variation of the transmission ratio. The rate of pump displacement change is controlled to further decrease respective engine and compressor speeds to 0.75 and 0.80 to maintain the constant supercharge, 120–130 in graphs A, D, E and F.

At point 130, termed the unlock point, governor 64 unlocks torque converter clutch 20, causing an increase from 0.75 to 0.95 in engine speed, graph D, as the converter is actuated at its coupling point where it slips. The sudden increase in engine speed causes a drop in manifold pressure which is sensed by controller 72. To increase manifold pressure to 2 atmospheres, controller 72 suddenly decreases pump displacement which increases pump speed and compressor speed, graphs B and E. The fuel supply is adjusted to accommodate increased engine speed.

At output speeds below point 130, the torque converter allows the engine to remain at a high power output speed because of increasing slip and also provides torque multiplication. To limit the supercharge, pump displacement is decreased at a predetermined rate causing slight reductions in engine and compressor speeds until the pump displacement reaches 0.40, a practical limit for the same reasons discussed above with regard to the motor at 96–97–100 in graph E, at a limit of adjustment point 140.

As the load speed decreases below point 140, the hydrostatic transmission leg can be adjusted no further. The engine speed will thereafter slowly decrease to approximately 0.60 at a second atmospheric point, denoted 150, because the torque converter slips. As the load speed continues to slow as the load increases, the compressor speed decreases in proportion to load speed and an increasing proportion of air for the engine is supplied through the compressor bypass valve to maintain the naturally aspirated condition of the engine. The power curve 90 then diminishes to 0 at a load speed of 0, while engine speed decreases to 0.60 as defined by the stall characteristics of the torque converter.

The comparative power output over the same load speed range by the power plant having a 40 per cent larger naturally aspirated engine with ten speed transmission is seen by inspection of curve 95 and the comparison will indicate the dramatic advantage of the subject power plant. For example, on a 3 per cent grade the subject power plant can maintain a load speed of approximately 77 per cent of cruising speed, while the larger engine power plant can maintain a speed of only 68 per cent. More significantly, on a 5 per cent grade the subject power plant can maintain a load speed of 60 per cent while the other power plant can maintain a speed of only 48 per cent.

Thus the subject power plant can utilize a much smaller displacement engine than previously known and still maintain a significant reserve power for hill climbing capabilities. With more power available from approximately the 12–80 per cent of cruising speed range, it will be readily understood that a dramatically improved acceleration capability is achieved. This is particularly significant for a commercial truck entering a level grade, limited access highway where rapid acceleration to a minimum traffic speed is necessary.

The acceleration characteristics from 0 load speed for the truck powered by the subject power plant are just the reverse of the grade climbing characteristics described above, but will be explained briefly for purposes of clarification. Full depression of the pedal 77 has no hydrostatic effect because controller 72 has already reduced the pump 48 to its minimum displacement. The fuel control 14 however, would be controlled to deliver maximum fuel/air ratio to engine 10. The engine speed initially is at 0.60 which is enabled by the torque converter stall characteristic. Similarly the manifold pressure is at atmospheric, the compressor speed at 0, the pump displacement at 0.40 and the motor displacement at 1.0. The drive is now primarily through the hydrostatic leg. As the load speed increases, the compressor speed increases in proportion while the torque converter holds the engine at nearly constant speed. At first the compressor merely supplies an increasing portion of the naturally aspirated air needed by the engine but eventually it begins to create a net supercharge. As the load speeds up further the compressor continues to speed up and the engine now begins to increase in speed until the limiting supercharge is achieved at the limit of adjustment point 140. At this point engine speed and compressor speed are at 0.90 and the pump displacement is at 0.40. Thereafter pump displacement is increased by controller 72, which increases compressor speed slightly to 0.95, and the engine speed similarly increases to 0.95.

At point 130 the torque converter is locked up by governor 64, causing a drop in engine speed which increases manifold pressure and causes controller 72 to suddenly increase the displacement of pump 48. This reduces both compressor and engine speeds to 0.75, and maintains manifold pressure at 2 atmospheres. After the lock up of the torque converter, controller 72 increases pump displacement, which continues to rise to crossover point 120, after which the pump is maintained at full displacement and the motor displacement is decreased. During this period, the engine speed and the compressor speed are increased to peak power point 110.

To change the drive ratio to the load, motor displacement continues to decrease, causing a greater portion of the drive to be through the direct mechanical connection, thereby decreasing compressor speed and manifold pressure. This causes a drop-off in power at a point beyond 70 per cent of cruising speed where great reserve power is not necessary. The power plant continues to operate in the mode described until the atmospheric point 100 is reached at approximately 90 per cent of cruising speed. The motor displacement is then, as previously noted, either sharply or gradually reduced from 0.40 to 0, thereby shifting to a completely mechanical overdrive which causes a drop of compressor speed to 0. The engine then operates naturally aspirated and the compressor is bypassed.

The subject power plant also has provision for a simple low speed reverse. By operating valve 51 to reverse the direction of flow between pump 48 and motor 52, the motor will reverse its direction of rotation. In this mode of operation the hydrostatic output torque overcomes the opposing mechanical torque and produces reverse rotation of shaft 58.

Another feature of the subject power plant is the inherent availability of overrun or dynamic braking which is useful for a truck descending a grade. The load will power both the ring gear 36 through shaft 58 and the sun gear 34 through the hydrostatic leg. This causes motoring of engine 10. Although drag transmitted across the torque converter is small, braking effect is contributed by hydraulic losses in the hydrostatic leg and compressor power absorption which causes compressor 44 to "blow over" the engine for cooling purposes. This "blowing over" also provides a tow-start capability for engine 10.

This invention provides a complete power plant with engine, transmission and controls, all interrelated and interacting to produce a desired predetermined power output characteristic. Whereas differentially supercharged engines, torque converters, and split path transmissions are well known in the prior art, they have not heretofore been assembled in such an interrelated manner to provide such a power plant. Each element of the subject power plant has plural functions which affect and are affected by the other elements. The hydrostatic leg provides a controllable variable ratio transmission, while enabling desirable high power output engine speed and regulating compressor speed to control the manifold pressure. The differential enables a speed split between compressor and load and also a power transmission split between mechanical and hydrostatic. The torque converter enables torque multiplication at low road speeds so that it can slip efficiently to permit high engine speeds without excessive supercharge. The various controls sense actual and desired operating characteristics and regulate operation of the elements to optimize operation of the power plant.

Of course, equivalent elements may be used for those specifically detailed herein without departing from the scope of the invention. The mechanical differential could be replaced with a different mechanical, hydraulic or electrical one. The hydrostatic leg could be mechanical, electrical or hydrodynamic. The torque converter could be a mechanical, hydraulic or electrical device. The compressor could be of a type other than positive displacement. The engine could be spark-ignition. The controls could take different form. These are merely some of the alternatives envisaged within the scope of this invention which could yield a power plant having the same or similar power output characteristics and which are contemplated within the scope of the following claims.

I claim:

1. A power plant for driving a load, including an air breathing engine having a fuel supply, characterized by a variable power splitting device having an input and first and second outputs, first connecting means operatively interconnecting the engine and the input, second connecting means operatively interconnecting the first output and the load, an auxiliary air device for the engine connected to the second output, and regulating means for the power plant including a controller for automatically controlling the speed ratio of the variable power splitting device to vary the power split between the outputs to cause the power plant to produce a predetermined power output characteristic.

2. A power plant according to claim 1, wherein the controller includes a manual input and is responsive to both the manual input and to a speed condition of the power plant to control the variable power splitting device.

3. A power plant according to claim 2, wherein the controller is also responsive to a second speed condition of the power plant.

4. A power plant according to claim 3, wherein the speed conditions are engine speed and second connecting means speed.

5. A power plant for driving a load, including an air breathing engine having an intake manifold, characterized by a variable fuel supply, a differential device having an input and first and second outputs, first connecting means operatively interconnecting the engine and the input, second connecting means operatively interconnecting the first output and the load, an auxiliary air device for the engine connected to the second output, variable ratio power transmitting means connecting one output with the other output or input, and regulating means for the power plant including a controller for controlling the ratio of the variable ratio power transmitting means to control the speed relationship among the engine, load and auxiliary air device and thereby cause the power plant to produce a predetermined power output characteristic.

6. A power plant according to claim 5, wherein the variable ratio power transmitting means is located between the first and second outputs.

7. A power plant according to claim 6, wherein the variable ratio power transmitting means include a hydrostatic fluid pump device driven by the second output and a hydrostatic fluid motor device driven by the pump device and connected to the first output, at least one of the hydrostatic devices having a variable displacement controlled by the controller.

8. A power plant according to claim 7, wherein the controller is responsive to the speed of the engine for controlling the displacement of the variable displacement hydrostatic device.

9. A power plant according to claim 7, wherein the regulating means include control valve means for enabling reversing rotation of the hydrostatic motor device to effect reverse rotation of the second connecting means and resultant reverse drive of the load.

10. A power plant according to claim 6, wherein the controller is responsive to a speed condition of the power plant to control the variable ratio power transmitting means.

11. A power plant according to claim 10, wherein the speed condition is the speed of the engine.

12. A power plant according to claim 11, wherein the regulating means include a manually adjustable control for the controller and the controller is also responsive to the manually adjustable control and to manifold pressure control to selectively control both the variable fuel supply and the variable ratio power transmitting means.

13. A power plant according to claim 12, wherein the variable fuel supply is controlled by the controller and is responsive to intake manifold pressure to regulate the fuel supplied to the engine.

14. A power plant according to claim 6, wherein the first connecting means include a hydrodynamic torque transmitting device.

15. A power plant according to claim 14, wherein the controller is responsive to a first speed condition of the power plant for controlling the variable ratio power transmitting means, and the regulating means include a governor responsive to a second speed condition of the power plant to control the hydrodynamic torque transmitting device to allow the engine speed to increase above the input speed when the second speed is below a predetermined value.

16. A power plant according to claim 15, wherein the hydrodynamic torque transmitting device has lock-up means, and the second speed is second connecting means speed to which the governor is responsive to control the lock-up means.

17. A power plant according to claim 16, wherein the regulating means include a manually adjustable control for the controller, the first speed is engine speed, and the controller is responsive to the manually adjustable control, to engine speed and to manifold pressure to selectively control both the variable fuel supply and the variable ratio power transmitting means.

18. A power plant according to claim 17, wherein the variable fuel supply is controlled by the controller and is responsive to intake manifold pressure to regulate the fuel supplied to the engine.

19. A power plant according to claim 5, wherein one of the connecting means include a variable speed torque transmitting device.

20. A power plant according to claim 19, wherein the variable speed torque transmitting device is included in the first connecting means.

21. A power plant according to claim 20, wherein the variable speed torque transmitting device is a hydrodynamic torque converter having lock-up means.

22. A power plant according to claim 21, wherein the regulating means include a governor responsive to the speed of the second connecting means for controlling the lock-up means.

23. A power plant according to claim 5, wherein the auxiliary air device comprises a positive displacement air compressor and the controller is responsive to the intake manifold pressure to control the variable ratio power transmitting means to limit the intake manifold pressure to a predetermined value.

24. A power plant according to claim 5, wherein the differential device includes planetary gearing having a sun gear connected to the second connecting means, a ring gear connected to the auxiliary air device, and a planet carrier connected to the first connecting means.

25. A power plant for driving a load, including an air breathing engine having an intake manifold, characterized by a variable fuel supply, a differential device having an input and first and second outputs, a hydrodynamic torque converter with lock-up means operatively interconnecting the engine and the input, connecting means operatively interconnecting the first output and the load, an auxiliary air device for supercharging the engine connected to the second output, a variable displacement hydrostatic device interconnecting the second and first outputs, and regulating means for controlling both the torque converter lock-up means and the hydrostatic device displacement and being responsive to load speed and engine speed to cause torque converter lock-up and cause the hydrostatic device to stop the second output and thus the auxiliary air device to cause drive of the load solely by the first output above a predetermined load speed, and as load speed decreases to successively vary the displacement of the hydrostatic device to progressively increase the speed of the second output and thus the auxiliary air device to provide engine supercharge and a variable ratio split path drive to the load by both outputs and thereafter to unlock the torque converter to enable engine speeds greater than input speeds and concurrent torque multiplication.

26. A power plant according to claim 25, wherein the regulating means are also responsive to intake manifold pressure and are operable to provide optimum fuel supply and to limit intake manifold pressure to a predetermined value.

27. A power plant according to claim 26, including a manual control for the regulating means to modify control of the hydrostatic device displacement by the regulating means.

* * * * *